(12) United States Patent
Miyamoto

(10) Patent No.: US 7,239,049 B2
(45) Date of Patent: Jul. 3, 2007

(54) MOVING MAGNET TYPE LINEAR ACTUATOR

(75) Inventor: Yasuhiro Miyamoto, Fukuoka (JP)

(73) Assignee: Kabushiki Kaisha Yaskawa Denki, Fukuoka (JP)

( * ) Notice: Subject to any disclaimer, the term of this patent is extended or adjusted under 35 U.S.C. 154(b) by 0 days.

(21) Appl. No.: 10/575,256

(22) PCT Filed: Sep. 14, 2004

(86) PCT No.: PCT/JP2004/013351

§ 371 (c)(1),
(2), (4) Date: Apr. 10, 2006

(87) PCT Pub. No.: WO2005/036718

PCT Pub. Date: Apr. 21, 2005

(65) Prior Publication Data

US 2007/0057579 A1     Mar. 15, 2007

(30) Foreign Application Priority Data

Oct. 10, 2003  (JP) .............................. 2003-352248

(51) Int. Cl.
*H02K 41/00*  (2006.01)
(52) U.S. Cl. ...................................................... 310/12
(58) Field of Classification Search .................. 310/12
See application file for complete search history.

(56) References Cited

U.S. PATENT DOCUMENTS 4,883,994 A * 11/1989 Nikura ......................... 310/12

6,541,880 B2 * 4/2003 Okada et al. ................. 310/12

FOREIGN PATENT DOCUMENTS

| JP | 5-346120 A | 12/1993 |
| JP | 6-254734 A | 9/1994 |
| JP | 7-75325 A | 3/1995 |
| JP | 9-266659 A | 10/1997 |
| JP | 2000-116105 A | 4/2000 |

* cited by examiner

*Primary Examiner*—Darren E. Schuberg
*Assistant Examiner*—Nguyen Hanh
(74) *Attorney, Agent, or Firm*—Sughrue Mion, PLLC

(57) ABSTRACT

A moving magnet type linear actuator is provided, which can solve a problem of linear guide life even in case that magnetic attraction force between a magnet and an armature is reduced to perform a high-frequency acceleration and deceleration operation.

A stator of the linear actuator includes an armature 1 which is fixed onto a stator base 2 and has plural coils 11, and linear guide rails 6 arranged linearly so as to sandwich both sides of the armature 1; and a mover of the same includes a linear guide block 8 provided so as to slide on the linear guide rail 6, and a field magnet provided with plural field permanent magnets 3 which are arranged opposed to the armature part through an air gap, held in a hole portion 14A provided in anonmagnetic magnet holder 14, and arranged so that magnetic poles of the N-pole and the S-pole are different alternately, and with a magnetic back yoke 10 arranged in the back of the field permanent magnet 3 through an air gap, provided in a recess part 14B provided in a magnet holder 14, and formed by laminating thin plate-shaped electromagnetic steel plates.

6 Claims, 4 Drawing Sheets

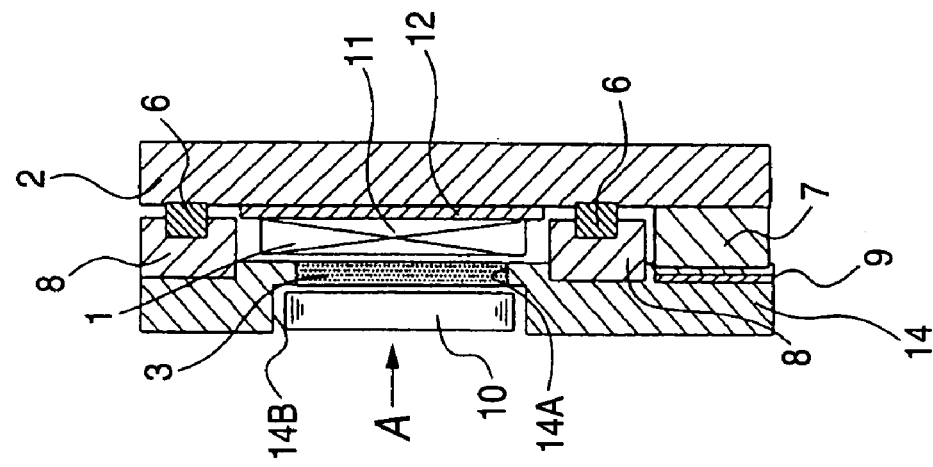
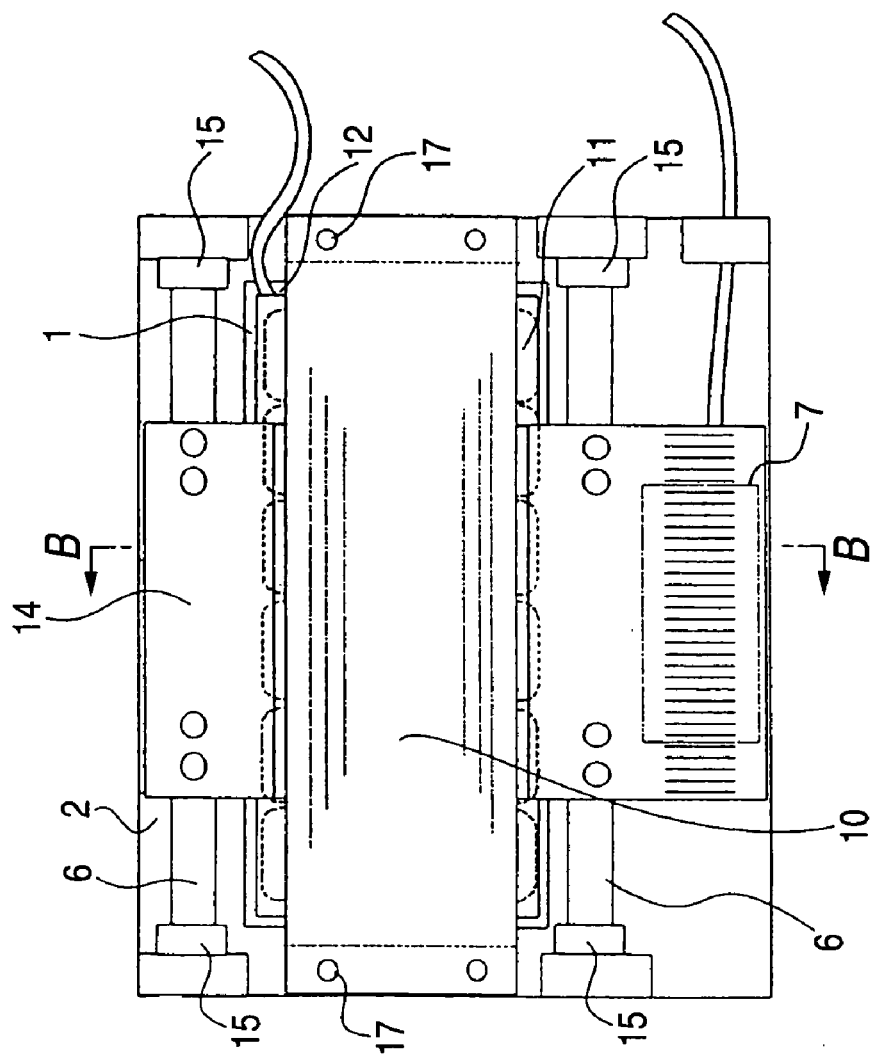

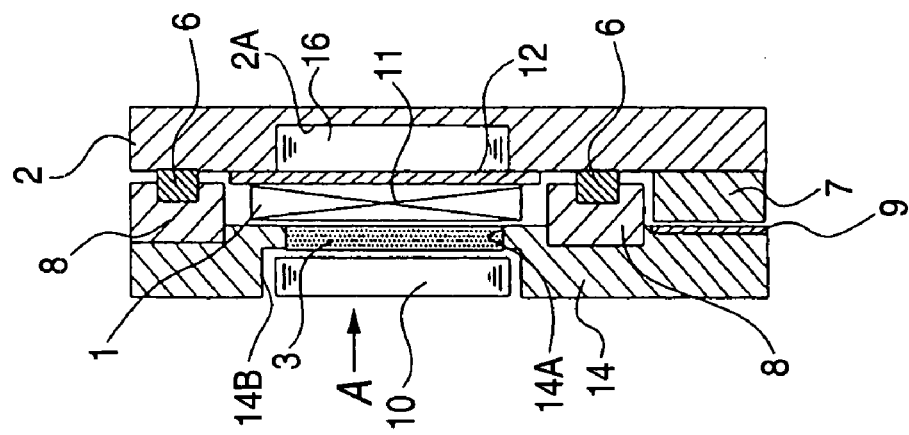
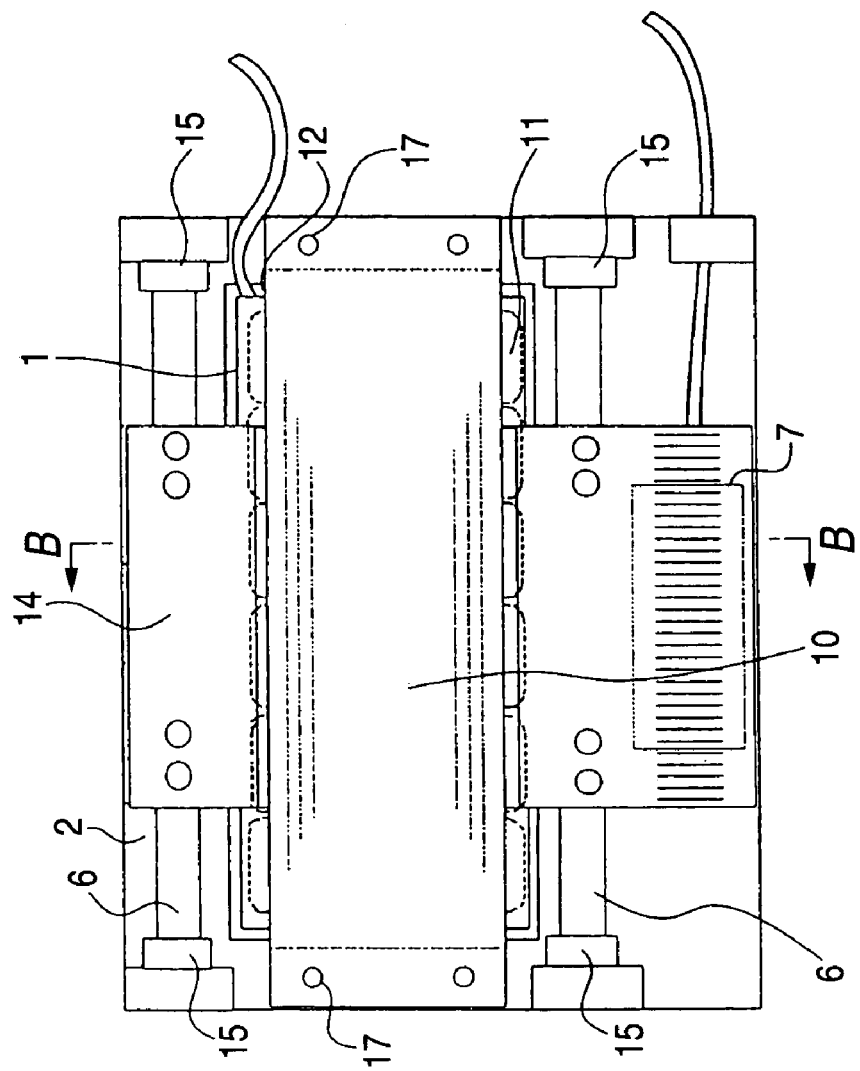
FIG. 2 (a)
FIG. 2 (b)

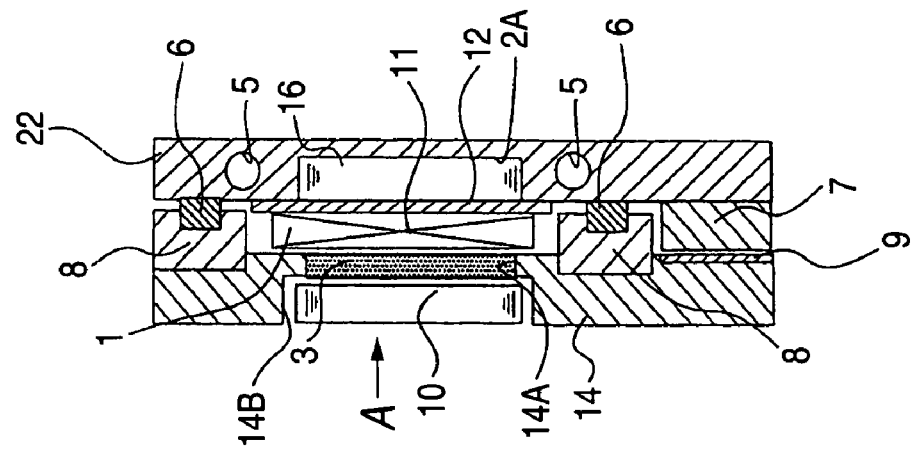
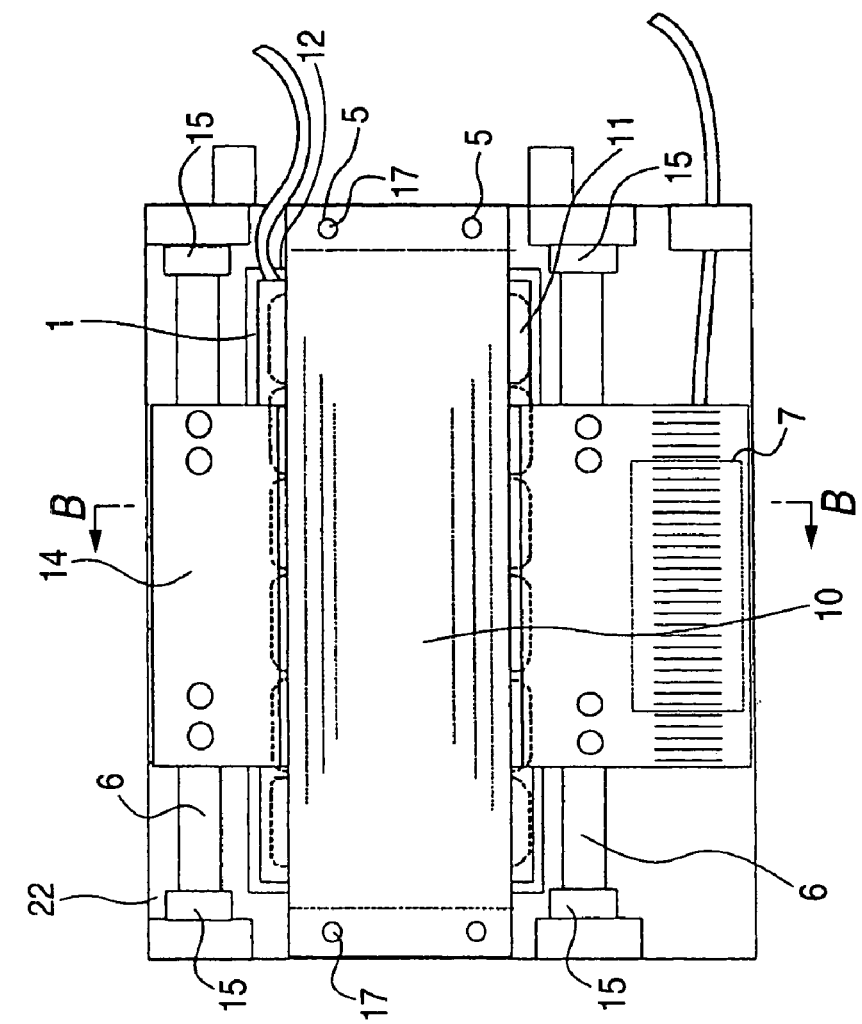

MOVING MAGNET TYPE LINEAR ACTUATOR

TECHNICAL FIELD

The present invention relates to a linear actuator which is used in an electric part mounting apparatus, a semiconductor-related apparatus, or various industrial machines such as a machine tool and the like, and is suited to drive its linear motion mechanism; and particularly to a moving magnet type linear actuator which includes a field magnet as a mover and an armature as a stator

BACKGROUND ART

A linear actuator as shown in FIG. 4 has been heretofore used in an electric part mounting apparatus, a semiconductor-related apparatus, or various industrial machines such as a machine tool and the like, and is suited to drive its linear motion mechanism. FIG. 4 shows a conventional moving magnet type linear actuator, in which FIG. 4(a) is a plan view thereof, FIG. 4(b) is a normal sectional view taken along a line of B-B in FIG. 4(a), and FIG. 4(a) corresponds to a perspective view, as seen in a direction of an arrow A in FIG. 4(b).

In FIG. 4, a reference numeral 1 is an armature, 2 is a stator base, 3 is a field permanent magnet, 4 is a field yoke, 6 is a linear guide rail, 7 is a sensor, 8 is a linear guide block, 9 is a linear scale part, 11 is a coil, 12 is a connection board, and 13 is a stopper.

In the linear actuator, the field yoke 4 is provided on the back of the field permanent magnet 3, and the field yoke 4 is used as both of a mover and a magnetic circuit. Further, the armature 1 has structure in which plural slotless coils 11 are provided on the connection board 12, and is arranged on the stator base 2 formed of a solid magnetic member through a magnetic gap for the mover, thereby to constitute the stator. On both sides of this armature 1, the linear guide rails 6 are fixed onto the stator base 2 in parallel, and the linear guide blocks 8 sliding on the linear guide rails 6 are fixed to lower portions of both end portions of the field yoke 4. Further, on a side surface of the mover, a magnet type linear scale 9 constituting a linear type encoder is arranged, and the sensor 7 for detecting the linear scale 9 is arranged on the stator base 2 so as to be opposed to this linear scale 9. Further, at end portions of the linear guide rail 6, stoppers 13 are provided in order to prevent the mover from overrunning.

This linear actuator has the magnetic circuit structure in which magnetic flux of the field permanent magnet 3 is interlinked with the stator base 2. Further, when the coil 11 of the armature is excited, the mover is moved linearly within a stroke of a difference between the armature length and the mover length by a moving magnetic field formed by the field magnet and the armature (refer to, for example, Patent Document 1).

Patent Document 1:
  JP-A-9-266659 (page 5 in specification, FIG. 3)

Disclosure of the Invention

Problems to be Solved by the Invention

However, in the related art, the field yoke constituting the field magnet part, which is great in specific gravity is provided as the mover, so that acceleration performance of the mover cannot be increased. Further, since magnetic attraction force that is four times or more larger than the maximum thrust acts between the magnet and the armature core (iron core), this magnetic attraction force provides a load on the linear guide, which causes the lift of the linear guide to shorten in case that a high-frequent acceleration and deceleration operation is performed.

The invention is made in order to solve the above problem. An object of the invention is to a moving magnet type linear actuator which can solve a problem of linear guide life even in case that magnetic attraction force between a magnet and an armature is reduced to perform a high-frequent acceleration and deceleration operation.

Means for Solving the Problems

In order to solve the above problem, according to a first aspect of the invention, there is provided with a moving magnet type linear actuator including: an armature part on a stator side, a field magnet part on a mover side, and an encoder which detects a position in a slide direction of the mover in relation to the stator, wherein the stator includes: a stator base, an armature part which is fixed onto the stator base and has plural coils, and linear guide rails arranged linearly so as to sandwich both sides of the armature part; the mover includes: a field magnet part provided with a field permanent magnet which is arranged so as to be opposed to the armature part through an air gap and is held by a nonmagnetic magnet holder and with a magnetic back yoke which is arranged at the back of the field permanent magnet through an air gap and fixed to the stator base at both ends thereof; and a linear guide block provided so as to slide on the linear guide rail; and the encoder is an optical encoder including: an optical linear scale arranged on a side surface of the magnet holder, and a sensor for detecting the linear scale, which is arranged opposed to the linear scale and on the stator base side.

According to a second aspect of the invention, there is provided with the moving magnet type linear actuator according to the first aspect, wherein the magnetic back yoke is formed of a thin plate-shaped laminated electromagnetic steel plate.

According to a third aspect of the invention, there is provided with the moving magnet type linear actuator according to the first aspect, wherein the stator is provided with a core buried in the stator base so as to be opposed to the armature part, and is formed by laminating thin-plate shaped electromagnetic steel plates in a direction perpendicular to the moving direction of the mover.

According to a forth aspect of the invention, there is provided with the moving magnet type linear actuator according to any one of the first to third aspects, wherein a refrigerant conduit tube or a jacket for forced liquid-cooling is buried in the stator base.

Effect of the Invention

According to the first aspect of the invention, the filed permanent magnet is buried in the nonmagnetic magnet holder that is the mover. Therefore, by reducing the weight of the mover, the acceleration performance of the mover can be heightened.

Further, since the magnetic back yoke which is arranged at the back of the field permanent magnet through an air gap and fixed to the stator base at its both ends is provided, the magnetic attraction force can be cancelled and the gap flux density can be made high. Therefore, high thrust, and high acceleration and deceleration can be realized. In result, even in case that the high-frequent acceleration and deceleration operation is carried out, the problem of the linear guide life caused by the magnetic attraction force can be solved.

Further, since the armature part that is a heat generator is on the fixed side, forced cooling structure in which a heat generating part collected at one spot on the fixed side is cooled by liquid can be adopted, so that cooling performance of the actuator can be heightened.

Further, since the linear actuator has the coreless structure, there is no cogging ripple, so that it can perform the very smooth operation.

According to the second aspect of the invention, the magnetic back yoke provided at the back of the field permanent magnet is formed of the laminated electromagnetic steel plate, whereby eddy current loss due to interlinkage of the field magnetic flux can be reduced, and iron-loss reducing effect in high-speed running becomes high.

According to the third aspect of the invention, the core formed by laminating the thin-plate shaped electromagnetic steel plates is buried in a recess part of the stator base so as to be opposed the armature. Therefore, the electric resistance of the stator part becomes great, and it is possible to reduce the eddy current loss produced by the interlinkage of the field magnetic flux due to the movement on the stator of the field permanent magnet that is the mover, so that the iron-loss reducing effect in high-speed running can be increased.

According to the fourth aspect of the invention, the refrigerant conduit tube is buried in the stator base. Therefore, by forced cooling performed by dashing coolant in the refrigerant conduit tube, the heat generating part collected at one spot on the stator side can be efficiently cooled, so that the cooling performance of the actuator can be improved.

BRIEF DESCRIPTION OF THE DRAWINGS

[FIG. 1]

FIG. 1 shows a moving magnet type linear actuator in a first embodiment of the invention, in which FIG. 1(a) is a plan view of the linear actuator, and FIG. 1(b) is a normal sectional view taken along a line of B-B in FIG. 1(a), and FIG. 1(a) corresponds to a perspective view, as seen in a direction of an arrow A in FIG. 1(b).

[FIG. 2]

FIG. 2 shows a moving magnet type linear actuator in a second embodiment of the invention, in which FIG. 2(a) is a plan view of the linear actuator, and FIG. 2(b) is a normal sectional view taken along a line of B-B in FIG. 2(a), and FIG. 2(a) corresponds to a perspective view, as seen in a direction of an arrow A in FIG. 2(b).

[FIG. 3]

FIG. 3 shows a moving magnet type linear actuator in a third embodiment of the invention, in which FIG. 3(a) is a plan view of the linear actuator, and FIG. 3(b) is a normal sectional view taken along a line of B-B in FIG. 3(a), and FIG. 3(a) corresponds to a perspective view, as seen in a direction of an arrow A in FIG. 3(b). FIG. 3 is a side sectional view showing an example 2 of application of the conventional example.

FIG. 4 shows a conventional moving magnet type linear actuator, in which FIG. 4(a) is a plan view of the linear actuator, and FIG. 4 (b) is a normal sectional view taken along a line of B-B in FIG. 4(a), and FIG. 4(a) corresponds to a perspective view, as seen in a direction of an arrow A in FIG. 4(b).

DESCRIPTION OF REFERENCE NUMERALS AND SIGNS

Figure 4:
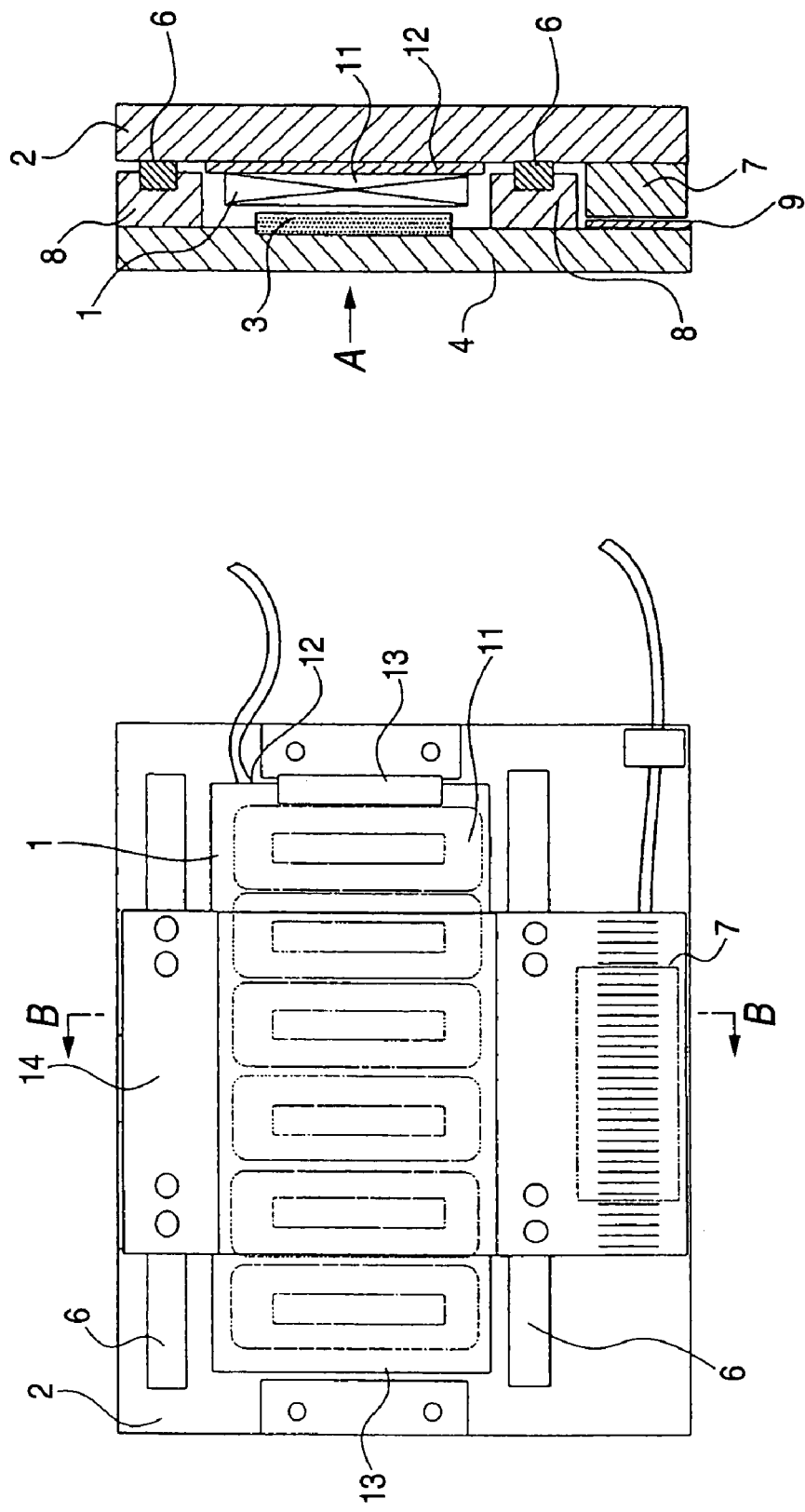
[FIG. 4]

1 Armature
2 Stator base
2A Recess part
3 Field permanent magnet
4 Field yoke
5 Refrigerant conduit tube
6 Linear guide rail
7 Sensor
8 Linear guide block
9 Linear scale part
10 Magnetic back yoke
11 Coil
12 Connection board
13,15 Stopper
14 Magnet holder
14A Hole portion
14B Recess part
16 Core
17 Bolt Best Mode for Carrying out the Invention Embodiments of the invention will be described below with reference to drawings.

EMBODIMENT 1

FIG. 1 shows a moving magnet type linear actuator in a first embodiment of the invention, in which FIG. 1(a) is a plan view of the linear actuator, and FIG. 1(b) is a normal sectional view taken along a line of B-B in FIG. 1(a), and FIG. 1(a) corresponds to a perspective view, as seen in a direction of an arrow A in FIG. 1(b).

In FIG. 1, a reference numeral 10 is a magnetic back yoke, 14 is a magnet holder, and 15 is a stopper.

The feature of the invention is as follows.

Namely, the feature is that: a stator of a linear actuator includes a stator base 2, an armature 1 which is fixed onto the stator base 2 and has plural coils 11, and linear guide rails 6 arranged linearly so as to sandwich both sides of the armature 1; and a mover of the linear actuator includes a linear guide block 8 provided so as to slide on the linear guide rail 6, and a field magnet including plural permanent magnets 3 which are arranged opposed to the armature part through an air gap, held in a hole portion 14A provided in a nonmagnetic magnet holder 14, and arranged so that magnetic poles of the N-pole and the S-pole are different alternately, and a magnetic back yoke 10 which is arranged in the back of the field permanent magnet 3 through an air gap and provided in a recess part 14B provided in the magnet holder 14. Specifically, the magnetic back yoke 10 is fixed onto the stator base 2 by bolts 17 so as to cover the field permanent magnet 3 and the armature 1.

Further, the magnetic back yoke 10 is formed by laminating thin plate-shaped electromagnetic steel plates in a direction perpendicular to the moving direction of the mover.

Further, a linear scale 9 constituting an optical encoder is arranged on a side surface of the magnet holder 14, and a sensor 7 for detecting the linear scale 9 is arranged on the stator base 2 side, opposed to the linear scale 9.

Further, at end portions of the two parallel linear guide rails, stoppers 15 for preventing overrun of the mover are provided.

Under such the construction, in this linear actuator, the number of field poles is smaller than the number of poles of super magnetic force produced in the armature part, and its difference makes stroke on the moving side of the linear actuator, so that the linear actuator performs linear movement.

Therefore, since the moving magnet type linear actuator according to the embodiment is so constructed that the field permanent magnet 3 is buried in the nonmagnetic magnet holder 14 that is the mover, weight reduction of the mover can heighten acceleration performance of the mover.

Further, since the magnetic back yoke 10 is arranged at the back of the field permanent magnet 3 in the magnet holder 14 through an air gap, magnetic attraction force can be cancelled, and gap flux density can be made large, so that high thrust and high acceleration and deceleration can be realized. In result, even in case that high-frequent acceleration and deceleration operation is carried out, the problem of the linear guide life caused by magnetic attraction force can be solved.

Further, since the armature 1 that is a heat generator is on the fixed side, forced cooling structure in which a heat generating part collected at one spot on the fixed side is cooled by liquid can be adopted, so that cooling performance of the actuator can be heightened.

Further, since the magnetic back yoke 10 is formed of the laminated electromagnetic steel plate, eddy current loss due to interlinkage of the field magnetic flux can be reduced, and iron-loss reducing effect in high-speed running becomes high.

Further, since the linear actuator has the coreless structure, there is no cogging ripple, so that it can perform the very smooth operation.

EMBODIMENT 2

Next a second embodiment of the invention will be described.

FIG. 2 shows a moving magnet type linear actuator in a second embodiment of the invention, in which FIG. 2(a) is a plan view of the linear actuator, and FIG. 2(b) is a normal sectional view taken along a line of B-B in FIG. 2(a), and FIG. 2(a) corresponds to a perspective view, as seen in a direction of an arrow A in FIG. 2(b).

In FIG. 2, a reference numeral 16 is a core.

The second embodiment is different from the first embodiment in the following point.

Namely, the different point is that: a stator base 2 is provided with a recess part 2A having the length equal to a full length of a coil 11 arranged on the base 2 and having the dimension equal to dimension in width of a field permanent magnet 3; and the core 16 formed by laminating thin plate-shaped electromagnetic steel plates in a direction perpendicular to the moving direction of a mover is provided in the recess part 2A so as to be opposed to an armature part.

Further, as material of the stator base 2, a magnetic such as iron is basically used. However, aluminum or aluminum alloy is preferably used to reduce the weight, and any of nonmagnetic materials such as titanium or titanium alloy, or magnesium or magnesium alloy may be used.

Thus, in the embodiment, the core 16 formed by laminating the thin plate-shaped electromagnetic steel plates is buried in the recess part 2A of the stator base 2 so as to be opposed to the armature 1. Therefore, the electric resistance of the stator part becomes large, so that it is possible to reduce the eddy current loss produced by interlinkage of the field magnetic flux due to the movement on the stator of the field permanent magnet that is the mover, and to increase iron-loss reducing effect in high-speed running.

EMBODIMENT 3

Next, a third embodiment of the invention will be described.

FIG. 3 shows a moving magnet type linear actuator in a third embodiment of the invention, in which FIG. 3(a) is a plan view of the linear actuator, and FIG. 3(b) is a normal sectional view taken along a line of B-B in FIG. 3(a), and FIG. 3(a) corresponds to a perspective view, as seen in a direction of an arrow A in FIG. 3(b).

In FIG. 3, a reference numeral 5 is a refrigerant conduit tube.

The third embodiment is different from the first embodiment in the following point.

Namely, the different point is that the refrigerant conduit tube 5 is buried in a stator base 2.

In the third embodiment, the refrigerant conduit tube 5 is buried in the stator base 2. Therefore, by forced cooling performed by dashing coolant in the refrigerant conduit tube, a heat generator collected at one spot on the stator side can be efficiently cooled, so that cooling performance of the actuator can be improved.

Further, in the embodiment, in place of the refrigerant conduit tube, a jacket for faced liquid cooling may be buried in the stator base 2

INDUSTRIAL APPLICABILITY

In the moving magnet type linear actuator of the invention, even in case that the magnetic attraction force between the magnet and the armature is reduced to perform the high-frequent acceleration and deceleration operation, the problem of linear guide life can be solved. Therefore, the invention can be applied also to a large-sized machine tool, a semiconductor manufacturing apparatus and the like which require high accuracy and high rigidity.

The invention claimed is:

1. A moving magnet type linear actuator comprising:
an armature part on a stator side,
a field magnet part on a mover side, and
an encoder which detects a position in a slide direction of the mover in relation to the stator, wherein
the stator includes: a stator base, an armature part which is fixed onto the stator base and has plural coils, and linear guide rails arranged linearly so as to sandwich both sides of the armature part;
the mover includes: a field magnet part provided with a field permanent magnet which is arranged so as to be opposed to the armature part through an air gap and is held by a nonmagnetic magnet holder and with a magnetic back yoke which is arranged at the back of the field permanent magnet through an air gap and fixed to the stator base at both ends thereof; and a linear guide block provided so as to slide on the linear guide rail; and
the encoder is an optical encoder including: an optical linear scale arranged on a side surface of the magnet holder, and a sensor for detecting the linear scale, which is arranged opposed to the linear scale and on the stator base side.

2. The moving magnet type linear actuator according to claim 1, wherein
the magnetic back yoke is formed of a thin plate-shaped laminated electromagnetic steel plate.

3. The moving magnet type linear actuator according to claim 2, wherein a refrigerant conduit tube or a jacket for forced liquid-cooling is buried in the stator base.

4. The moving magnet type linear actuator according to claim 1, wherein the stator is provided with a core buried in the stator base so as to be opposed to the armature part, and is formed by laminating thin-plate shaped electromagnetic steel plates in a direction perpendicular to the moving direction of the mover.

5. The moving magnet type linear actuator according to claim 4, wherein a refrigerant conduit tube or a jacket for forced liquid-cooling is buried in the stator base.

6. The moving magnet type linear actuator according to claim 1, wherein a refrigerant conduit tube or a jacket for forced liquid-cooling is buried in the stator base.

\* \* \* \* \*